July 29, 1924.
W. J. JAMISON
FISHING HOOK
Filed Aug. 8, 1923
1,502,781
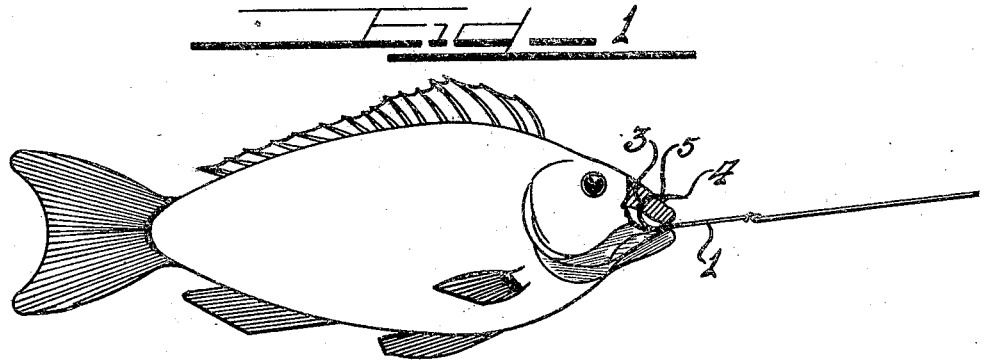
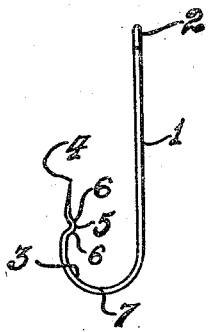
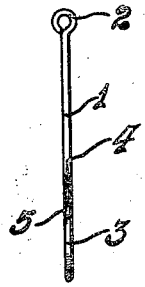
WITNESSES
N. Clifford.
O. Hartmann
INVENTOR
William J. Jamison.
by Charles W. Hills Attys Patented July 29, 1924.

1,502,781

UNITED STATES PATENT OFFICE.

WILLIAM J. JAMISON, OF CHICAGO, ILLINOIS.

FISHING HOOK.

Application filed August 8, 1923. Serial No. 656,347.

*To all whom it may concern:*

Be it known that I, WILLIAM J. JAMISON, a citizen of the United States, and a resident of the city of Chicago, in the county of Cook and State of Illinois, have invented certain new and useful Improvements in a Fishing Hook; and I do hereby declare that the following is a full, clear, and exact description of the same, reference being had to the accompanying drawings, and to the numerals of reference marked thereon, which form a part of this specification.

This invention relates to a barbless fish hook of the type disclosed in the patent to Williams 893,046.

At the present time, there are many State statutes prohibiting the capturing of fish under a certain size. In using fish hooks in capturing such fish, the latter are often seriously injured by the removal of the hook so that many of the under size fish that are returned to the water do not survive the injury and are soon seen floating upon the water.

To overcome this objection, it has been proposed to use barbless fish hooks, and provide the intermediate portion of the hook with a laterally extending offset having a right angled base. Such laterally extending offset with the right angled base did not entirely overcome the objections, since it was necessary to laterally twist the hook and force the same over the right angled shoulder of the offset. This operation in frequent instances caused injury to the tissue or flesh of the mouth of the fish.

To overcome this latter objection, I have provided a barbless fish hook in which the offset portion is arranged in the plane of the hook and is provided with sloping sides so that the hook can be removed in the natural way by simply rotating the same without any lateral movement.

The invention comprises the novel structure hereafter described and more particularly pointed out and defined in the appended claims.

In the accompanying drawing which illustrates a preferred embodiment of this invention and in which similar reference numerals refer to similar features in the different views:

On the drawings:

Figure 1 is an elevational view of a fish with part of the mouth thereof shown in section illustrating the manner in which the hook operates.

Figure 2 is an enlarged side elevation of the hook.

Figure 3 is an enlarged edge elevation of the hook.

In referring to the drawing, the reference numeral 1 indicates the shank of the hook, having an eye 2 for the attachment of a line, and a returned bent end 3 having a point 4, below which there is an offset portion 5. This portion 5 is directed inwardly toward the shank 1 and lies in the plane of the hook, that is in the plane of the shank 1 and the returned bent portion 3. This offset portion 5 has sloping or bevelled sides 6, and is adapted to go through the mouth of the fish and rest against the outer surface thereof as shown in Figure 1. The returned bent portion 3 is connected with the shank by an arcuate portion 7 so that the hook can be more easily rotated out of the mouth of the fish.

It will be appreciated that by directing the offset portion inwardly toward the shank 1 and bevelling the lower side thereof, there will be a wedging action between the shank 1 and such bevelled side upon the part of the mouth of the fish lying therebetween as shown in Figure 1. It will also be appreciated that the hook may be readily removed from the mouth of the fish by gripping it at the shank and swinging or rotating the same in the proper direction in the plane of the hook, the sloping offset portion passing readily through the aperture made in the flesh without seriously injuring the fish. In Figure 1, the shank of the hook will be rotated upwardly and it can be clearly seen how the hook can be rotated out of the mouth of the fish.

I am aware that numerous details of construction may be varied through a wide range without departing from the principles of this invention, and I therefore do not purpose limiting the patent granted, otherwise than necessitated by the prior art.

I claim as my invention:

1. A barbless fish hook having a shank and a returned bent end provided with an inwardly directed offset in the plane of the hook, said offset having bevelled sides.

2. A barbless fish hook comprising a shank having a returned bent end provided with an offset in the plane of the hook.

3. A barbless fish hook comprising a shank having a returned bent end, the portion between the shank and the returned bent end being of arcuate form, said returned bent end having an intermediate offset portion directed inwardly in the plane of the hook, and having bevelled sides for the purpose set forth.

4. A barbless fish hook comprising a shank having a hook portion provided with a bevelled offset in the plane of the hook.

5. A barbless fish hook comprising a shank having a hook portion provided with an inwardly directed offset portion having a lower bevelled surface whereby a wedging action is provided for securing a fish.

In testimony whereof I have hereunto subscribed my name in the presence of two subscribing witnesses.

WILLIAM J. JAMISON.

Witnesses:
 CARLTON HILL,
 OSCAR HARTMANN.